US007992190B2

(12) United States Patent
Mevissen et al.

(10) Patent No.: US 7,992,190 B2
(45) Date of Patent: Aug. 2, 2011

(54) AUTHORIZATION SCHEME TO SIMPLIFY SECURITY CONFIGURATIONS

(75) Inventors: Ron Mevissen, Kerkrade (NL); Mark Gilbert, Aachen (DE)

(73) Assignee: Microsoft Corporation, Redmond, WA (US)

( * ) Notice: Subject to any disclaimer, the term of this patent is extended or adjusted under 35 U.S.C. 154(b) by 962 days.

(21) Appl. No.: 11/341,279

(22) Filed: Jan. 27, 2006

(65) Prior Publication Data

US 2007/0180491 A1   Aug. 2, 2007

(51) Int. Cl.
*G06F 17/30*   (2006.01)
(52) U.S. Cl. .......... 726/2; 726/3; 726/4; 726/5; 726/27; 726/28; 726/29; 726/30; 713/168; 713/169; 713/170; 713/171; 713/172; 713/173; 713/174; 713/182; 713/183; 713/184; 713/185; 713/186; 709/225; 709/229
(58) Field of Classification Search ................... 707/1, 3, 707/9; 726/26, 27–30, 1–8, 16–18; 340/686.6; 713/166, 168–174, 182–186
See application file for complete search history.

(56) References Cited

U.S. PATENT DOCUMENTS

| | | | | |
|---|---|---|---|---|
| 6,947,943 | B2 * | 9/2005 | DeAnna et al. ............. | 717/120 |
| 2003/0014750 | A1 * | 1/2003 | Kamen ..................... | 725/25 |
| 2003/0221030 | A1 * | 11/2003 | Pontius et al. ............. | 710/107 |
| 2006/0236408 | A1 * | 10/2006 | Yan ............................. | 726/29 |

FOREIGN PATENT DOCUMENTS

| | | |
|---|---|---|
| KR | 20010096816 A | 11/2001 |
| KR | 20020090521 A | 12/2002 |
| KR | 20030018946 A | 3/2003 |
| KR | 20030054657 A | 7/2003 |
| KR | 20030073807 A | 9/2003 |

OTHER PUBLICATIONS

Ubiquitous Computing in Home Networks, Henning Schulzrinne et al, IEEE Communications Magazine Nov. 2003.*
Office Action cited in related Chinese Application No. 200780003709.5 dated Jul. 9, 2010.
International Search Report dated Jul. 5, 2007 for Application No. PCT/US2007/001098, 10 pages.

* cited by examiner

*Primary Examiner* — Taghi T Arani
*Assistant Examiner* — Josnel Jeudy

(57) ABSTRACT

Various technologies and techniques are disclosed that provide a centralized model to assign, monitor, and manage security on home electronic devices. A three-dimensional security matrix uses a role-based model that allows users to map security into groupings. Users can be assigned security levels based on application role (what activity is involved), user role (what each family member or guest is allowed to do), and device role (what this device is allowed to do while preserving system integrity). An authorization service determines whether a particular activity requested by the user should be granted or denied based upon whether the user has authorization to access the particular activity and whether the particular device can support the particular activity without comprising the security of the network.

18 Claims, 9 Drawing Sheets

AUTHORIZATION SCHEME TO SIMPLIFY SECURITY CONFIGURATIONS

BACKGROUND

Consumers are acquiring an increasing array of electronics, personal computers, and mobile devices. In addition to using and managing these devices, consumers also want to view digital media on these devices. For example, some consumers can watch TV on their mobile phones, or access recipes from the computer housed in their refrigerator door or elsewhere in the kitchen. Personal Digital Assistants (PDAs) can be used to send faxes, download reports, browse the Web, and more. Although these devices have made our lives easier in many ways, problems can arise with security on these devices.

Each device has different security capabilities based on their hardware and software platforms. For example, most existing devices that support Universal Plug and Play (UPnP) or simpler protocols have at best a hard coded encryption key, and quite often not even that. Users are required to understand what security measures, if any, are included with each device, and to program each individually. This can be time consuming, frustrating, and may not provide the level of security that the consumer ultimately needs or wants. For example, you can program a TV remote control to block certain channels so that under-age children cannot view undesirable media content. But programming the remote will do only that—it can not block the same user from downloading the same undesirable content onto a mobile phone or personal computer. Each consumer electronic device may have its own security setting(s) or none at all, depending on its hardware and/or software platform. Current security for a home device such as a DVD player, game player, or personal computer can grant or deny a user access that device, but cannot differentiate levels of usage. In addition, the security for one device cannot be applied to another device. Similarly, it cannot recognize what a user is allowed to do on another device.

Current PC networks, such as those in corporate settings, assume that each device on the network has the security capabilities to participate at the level required by the network. Devices in this case are either trusted or not. In other words, devices that do not meet this baseline of security are not allowed to participate in the network at all.

SUMMARY

Various technologies and techniques are disclosed that provide a centralized way to assign, monitor, and/or manage security on home devices. The technologies and techniques enable users to configure security on a home network without redundancy of effort in programming individual devices. Furthermore, a role-based security model allows users to map security into groupings. Numerous home electronic devices may participate in a home network with a centralized security authorization scheme, regardless of the level of sophistication of each device.

As one non-limiting example, an administrator can assign security based on a three-dimensional matrix: the application role (i.e. what activity or service is involved), the user role (i.e. what each family member or a guest is authorized to do), and the device role (i.e. what this device capable of doing while preserving system integrity). This three-dimensional matrix can be used to assign security to groups of home electronic devices that can connect directly or indirectly to a network, or directly to a particular electronic device on the network. Each of these devices can be assigned varying security levels, based on who the user is, which device is being accessed, and what activity the user is attempting. In one implementation, changes in devices, users, or applications can be made from a centralized security application without requiring reprogramming of other devices.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
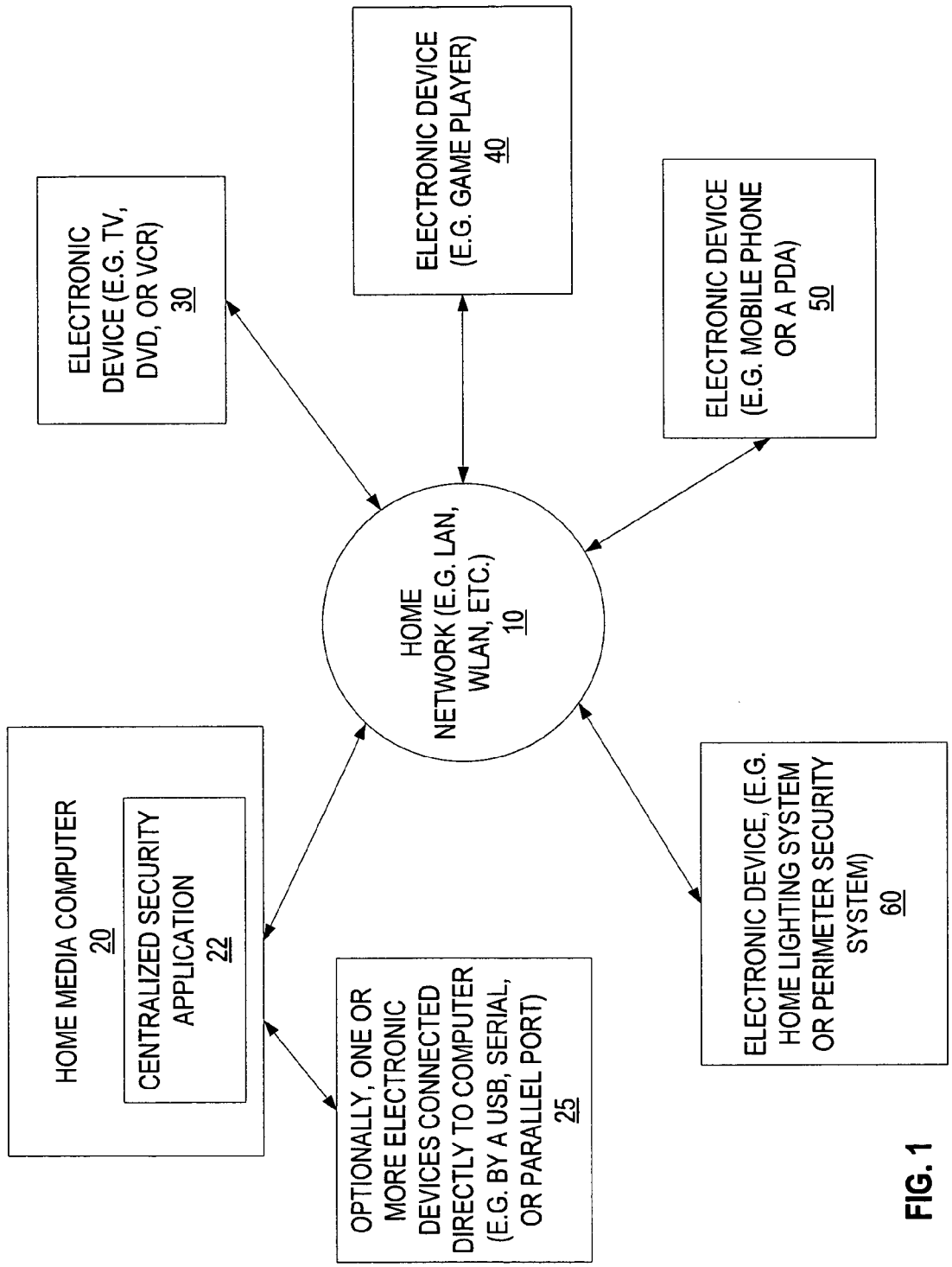
FIG. 1 is a diagrammatic view of a home network of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that provides a centralized security scheme for home-based electronic devices, but the system also serves other purposes in addition to these. In one implementation, one or more of the techniques described herein can be implemented as features within an operating system program such as MICROSOFT® WINDOWS® Media Center Edition, or from any other type of operating system, program or service that allows assignment of security settings. In another implementation, one or more of the techniques described herein are implemented as features within one or more devices that have the ability to connect directly or indirectly to a network, connect to a wireless local area network (WLAN), and/or be physically connected (via USB, serial port, parallel port, etc.). One or more of such devices in a home network could participate in this role-based security authorization scheme, to name a few non-limiting examples.

As shown in FIG. 1, an exemplary home network to use for implementing one or more parts of the system includes a network or at least one device that contains a communication connection 10. This device ties together a variety of home devices (20, 30, 40, 50, 60), allowing them to be able to communicate with each other as appropriate. One or more electronic devices can be directly connected to each other instead of or in addition to the network connection 10. In the example shown on FIG. 1, home media computer 20 has one or more electronic devices directly connected through one or more ports, such as a USB, serial, or parallel port. In other implementations, home media computer 20 does not have any devices directly connected. In yet another implementation, one or more electronic devices 25 are directly connected to any one or more of devices 20, 30, 40, 50, and or 60, and such directly connected devices 25 are able to participate in the home network 10.

Home media computer 20 in one implementation includes a centralized security application 22 that is accessible to the other home devices (30, 40, 50, and 60) over network 10, and/or to any devices, such as device 25, connected directly to any device on the network. Centralized security application 22 is responsible for managing the activities allowed to be performed by the devices on the network, as described in further detail herein.

Figure 2:
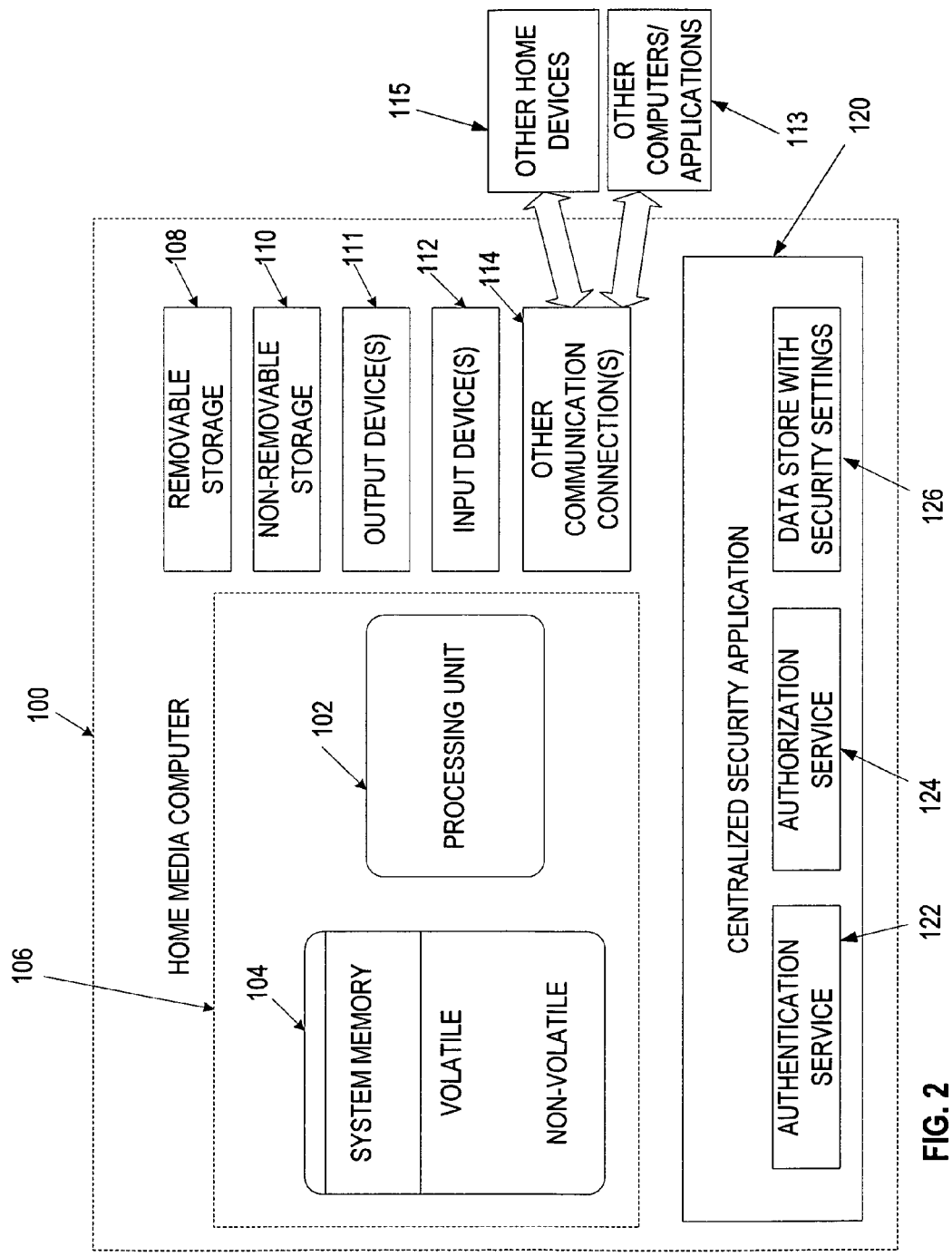
FIG. 2 is a diagrammatic view of a computer system of one implementation of the system of FIG. 1.

As shown in FIG. 2, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with one or more devices, such as other home devices 115. Computing device 100 may also communicate with one or more other computers and/or applications 113. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

In one implementation, computing device 100 is a home media computer that includes a centralized security application 120. Centralized security application has an authentication service 122, authorization service 124, and a data store 126 with security settings for the authentication and/or authorization service. In another implementation, data store is stored on a separate computer from computing device 100. As discussed with reference to FIG. 1, centralized security application 120 is responsible in one implementation for managing the activities allowed to be performed by the devices on the network, as described in further detail in the figures that follow.

While centralized security application (22 on FIG. 1 and 120 on FIG. 2) is shown to reside on home media computer (20 on FIG. 1 and 100 on FIG. 2), it will be appreciated that centralized security application can be alternatively or additionally located on one or more separate computers.

Figure 3:
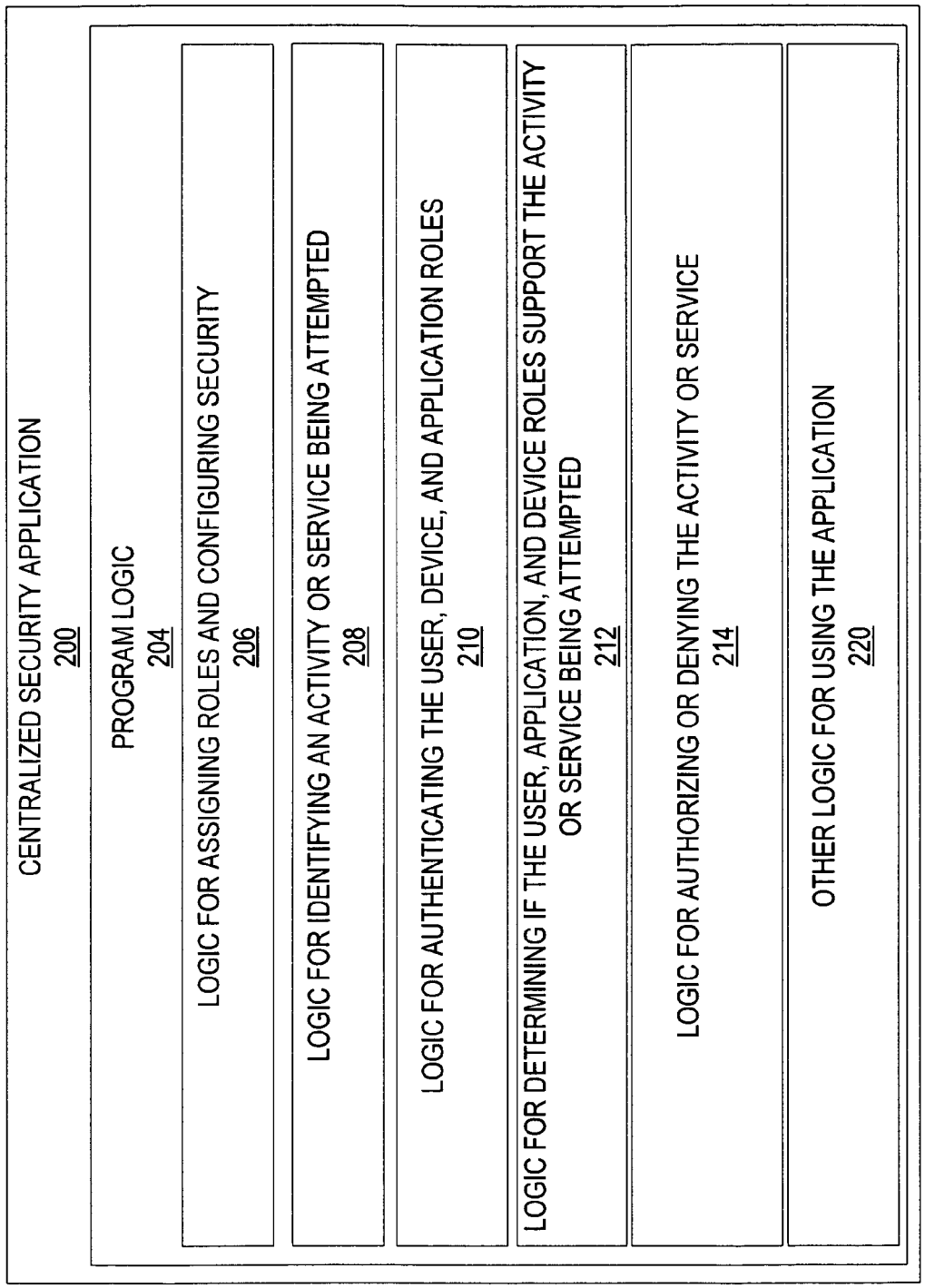
FIG. 3 is a diagrammatic view of a security authorization program operating on the computer system of FIG. 2.

Turning now to FIG. 3 with continued reference to FIGS. 1 and 2, a centralized security application 200 operating on computing device 100 is illustrated. Security application 200 is one of the application programs that resides on computing device 100. Alternatively or additionally, one or more parts of security application 200 can be part of system memory 104, on other devices 115, or other such variations as would occur to one in the computer software art. As one non-limiting example, security application 200 can be included as part of the functionality of an operating system for computing device 100, such as one running MICROSOFT® WINDOWS® Media Center Edition, or Linux, to name a few non-limiting examples.

Security application 200 includes program logic 204, which is responsible for carrying out some or all of the techniques described herein. Program logic 204 includes logic for assigning roles and configuring security 206, logic for identifying activities on each home device 208, logic for verifying user, device, and application roles 210, logic for analyzing user requests based on a security authorization matrix 212, logic for authorizing or denying a user access to perform an activity on a recognized device 214, and other logic for operating the application 220. In one implementation, program logic 204 is operable to be called programmatically from another program, such as using a single call to a procedure in program logic 204. In another implementation, one or more parts of program logic 204 are operable to be called as a web service, such as an XML web service.

In one implementation, program logic 204 resides on computing device 100. However, it will be understood that program logic 204 can alternatively or additionally be embodied as computer-executable instructions on one or more computers and/or devices and/or in different variations than shown on FIG. 2. Alternatively or additionally, one or more parts of security application 200 can be part of system memory 104, on other computers and/or applications 113, on other devices 115, or other such variations as would occur to one in the computer software art.

Figure 4:
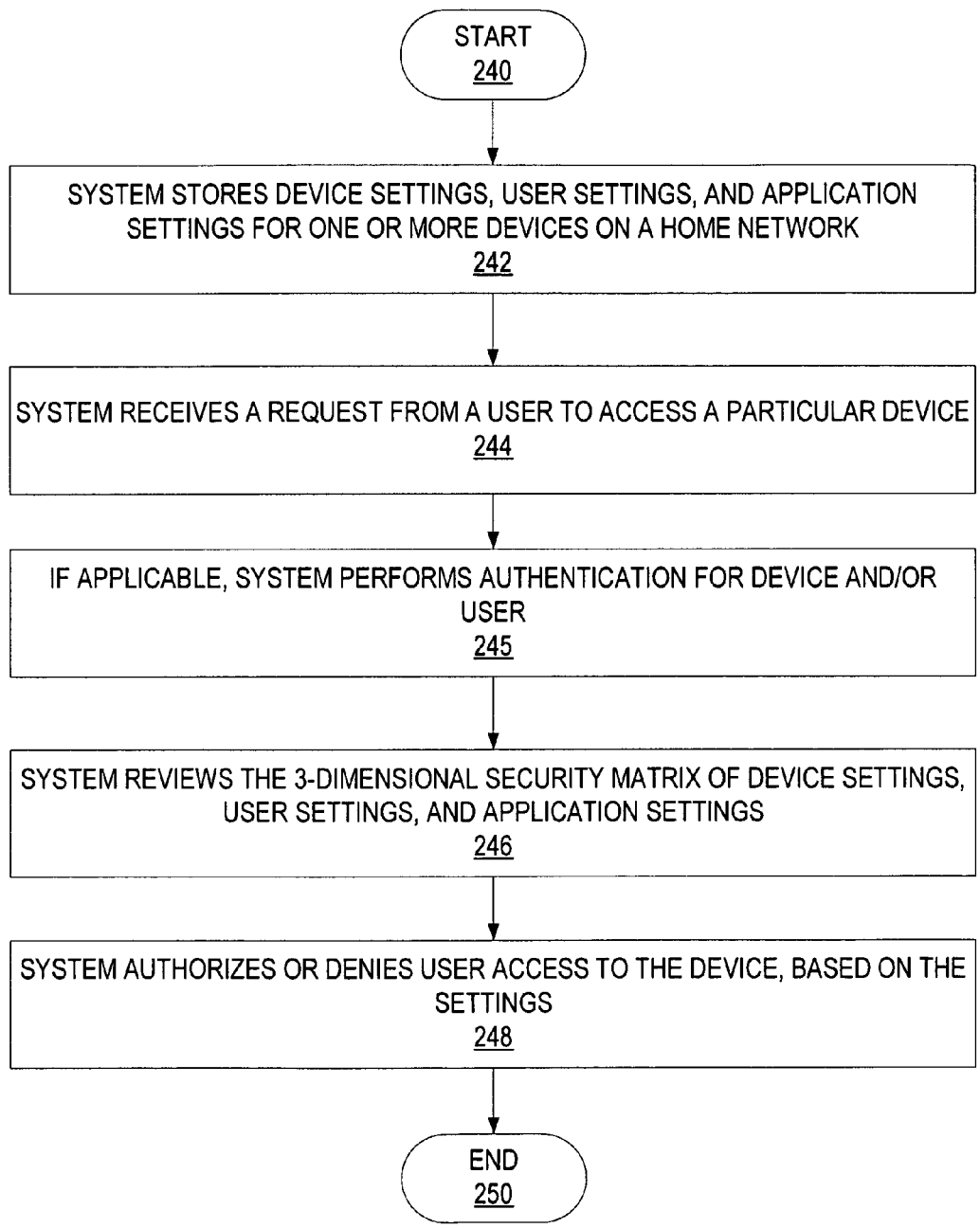
FIG. 4 is a high-level process flow diagram for one implementation of the system of FIG. 1.
Figure 5:
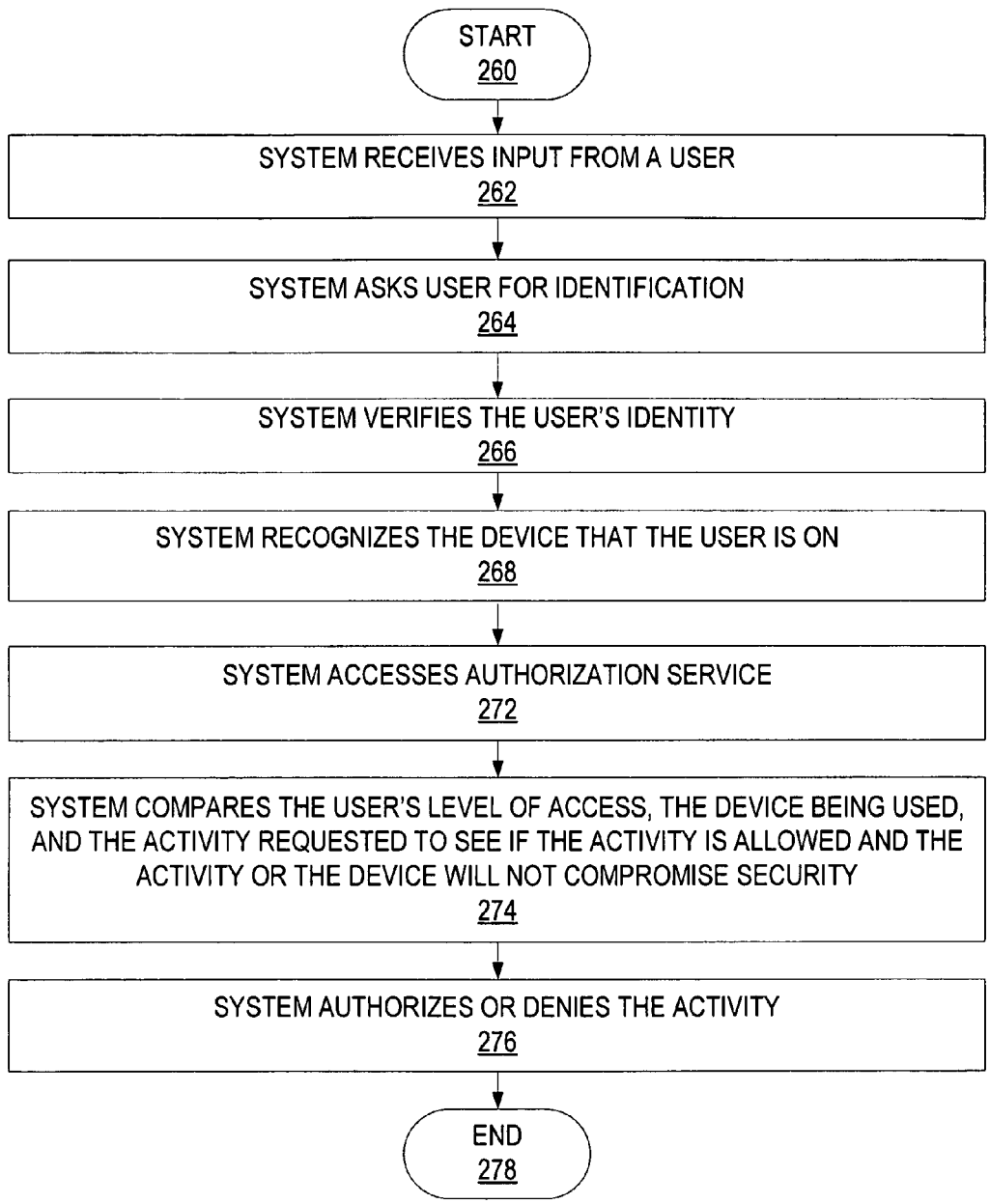
FIG. 5 is a high-level process flow diagram for one implementation of the system of FIG. 1 illustrating the stages involved in allowing or denying access within the system of FIG. 1.

Turning now to FIGS. 4-5 with continued reference to FIGS. 1-3, the stages for implementing one or more implementations of security application 200 are described in further detail. FIG. 4 is a high level process flow diagram for security application 200. In one form, the process of FIG. 4 is at least partially implemented in the operating logic of computing device 100.

The procedure begins at start point 240 with the system storing device settings, user settings, and application settings, such as in a 3-dimensional matrix, for one or more devices on a home network. As one non-limiting example, a person designated as the administrator can use security application 200 to define security parameters by designating one or more levels of access using one or more identifiers, such as a user role, a device role, and an application role (stage 242). When the system receives a request from a user to access a device (stage 244), the system performs an authentication step for the device and/or user, if appropriate (stage 245). As one non-limiting example, the user can be prompted to specify a login credential. As another non-limiting example, the user may not be prompted to specify a login credential. The system reviews the 3-dimensional security matrix of device settings, user settings, and application settings (stage 246) to compare the user and the device to the security matrix to see if that user is allowed access to the device and is allowed to perform that activity on that device. Based on the security settings, the system uses program logic 214 either to authorize or deny the user's request (stage 248). The process ends at end point 250.

FIG. 5 illustrates one implementation of a more detailed process for home security application 200. In one form, the process of FIG. 5 is at least partially implemented in the operating logic of computing device 100. The procedure begins at start point 260 with the system receiving input from a user to access a device (stage 262). The system asks the user to identify himself or herself, using a unique identifier such as a PIN or other form of login credentials (stage 264). The system executes program logic 210 to verify the user's identity (stage 266) and program logic 208 to confirm what device the user is attempting to access (stage 268). Then the system accesses the security matrix (data store 126 on FIG. 1) using the security authorization service to check to see if the user is allowed to perform the requested activity on that device (stage 272). By comparing the security matrix's information about the user role, device role, and application role to the scenario at hand, the system determines whether has access to, and can safely perform the activity requested on the device without jeopardizing system security (stage 274). Based on this analysis, the system executes program logic 214 to either allow or deny user access (stage 276). In one implementation, this three-dimensional security matrix allows a device to be authorized for certain activities that do not compromise the security of the network, while being denied for other activities that would compromise the security of the network. The process ends at end point 278.

Figure 6:
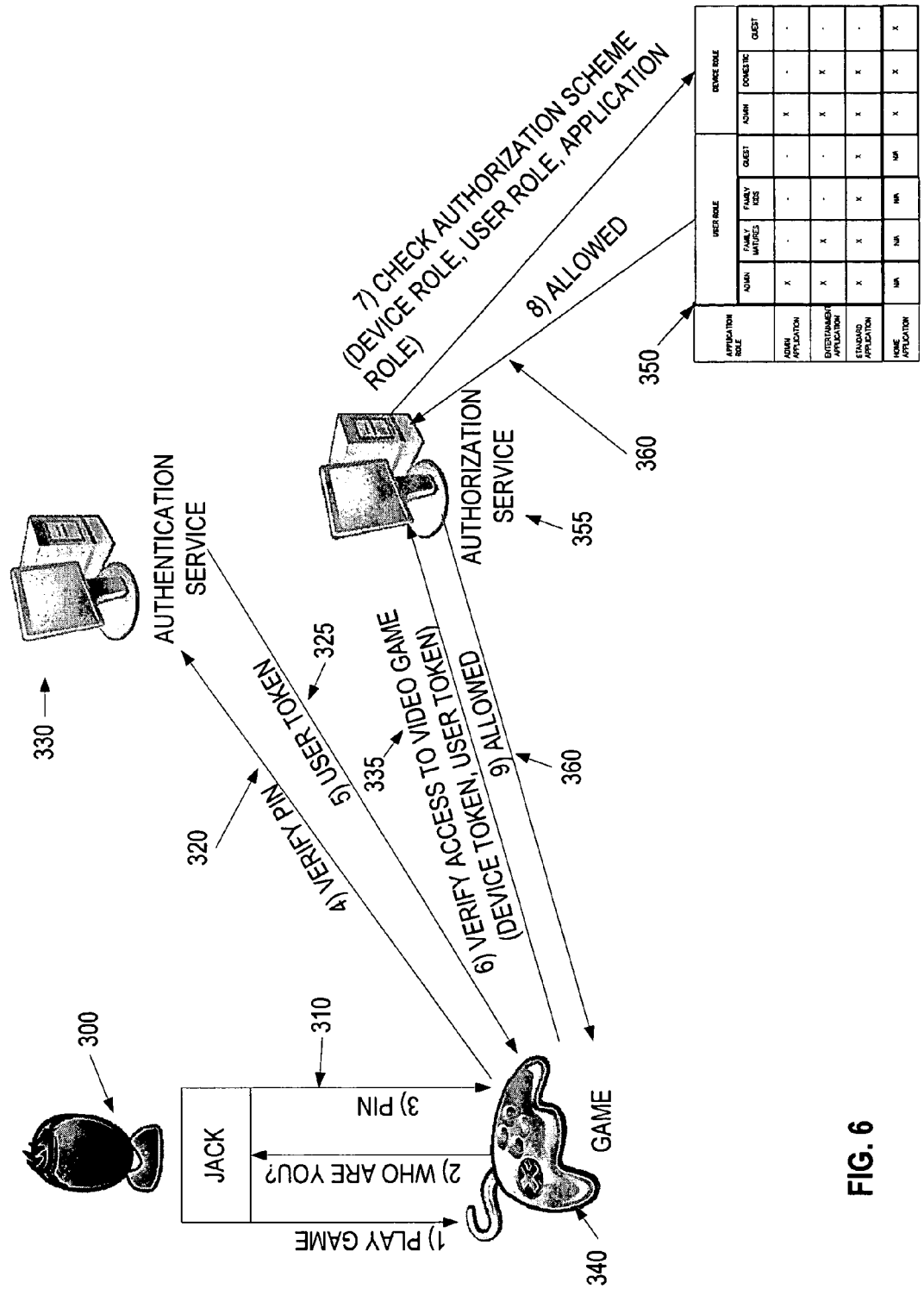
FIG. 6 is a flow diagram for one implementation of the system of FIG. 1 illustrating the stages involved in requesting access to a device and an activity of the system of FIG. 1.

FIG. 6 illustrates the stages involved in checking security access in one implementation. In one form, the process of FIG. 6 is at least partially implemented in the operating logic of computing device 100. The user 300 performs an action on a device 340, such as a gaming device, that activates the security authentication and authorization process. The system asks the user to enter login credentials (stage 310) and verifies the pin entered (stage 320). Authentication service 330 is checked to verify the credentials and a user token is issued (stage 325). The system then accesses authorization service 355 to determine if the user can access the device (in this example, the gaming device) and use it for the activity that is being attempted (stage 335). If the device role, user role, and application role in the security matrix 350 indicate that the device is capable of performing the activity without jeopardizing security and the user has the appropriate level of security to do the activity, then the system allows the activity (stage 360).

Figure 7:
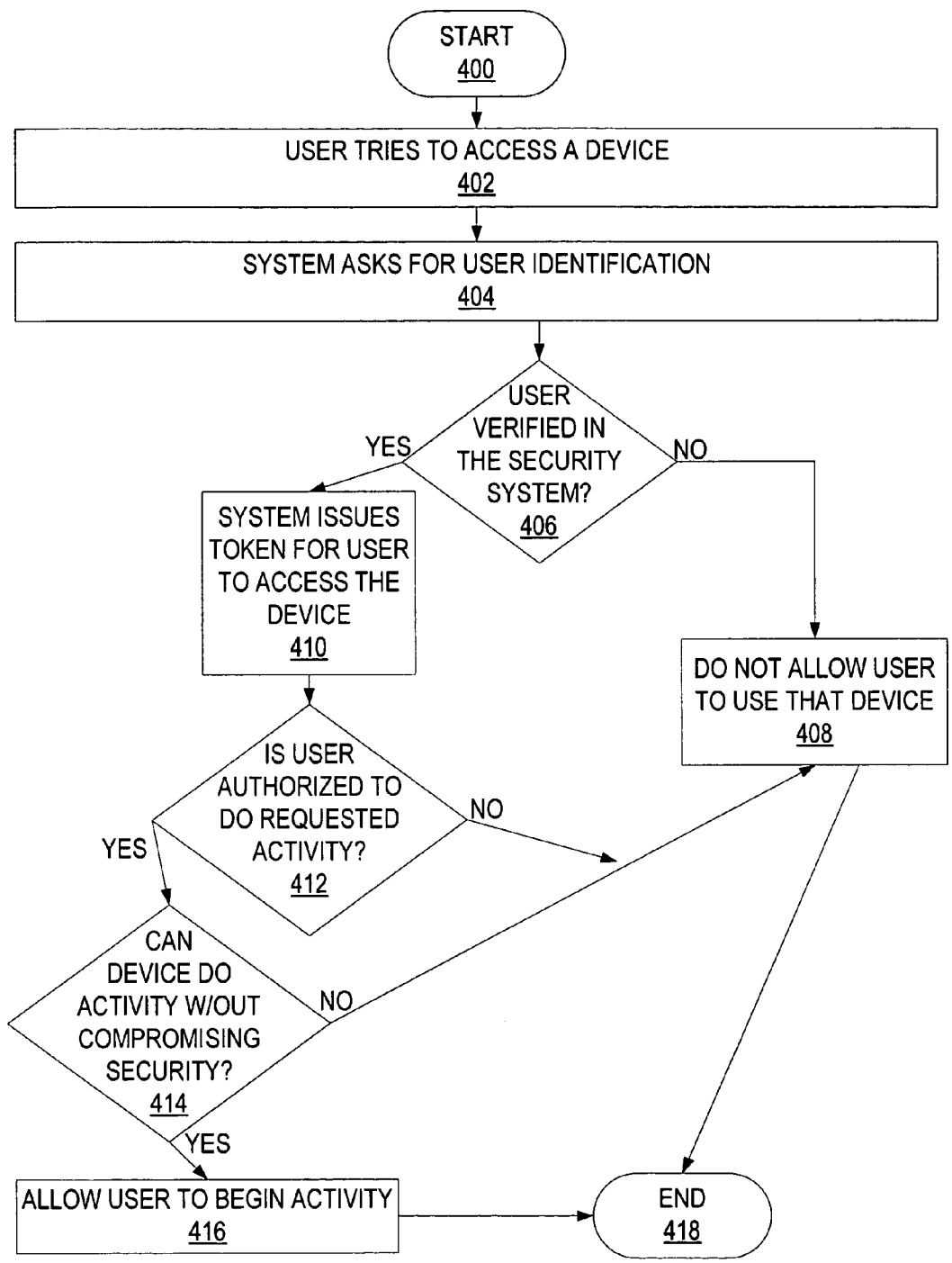
FIG. 7 is a process flow diagram for one implementation of the system of FIG. 1 illustrating the stages involved in authorizing access to a device and an activity of the system of FIG. 1.

FIG. 7 illustrates the process for checking security authorization involved in one implementation. In one form, the process of FIG. 7 is at least partially implemented in the operating logic of computing device 100. The process begins at start point 400 when the user tries to access a device (stage 402). The system asks the user for identification (stage 404), which can take a number of forms, including, but not limited to, a PIN or other unique login credential or identifier. The system executes program logic 210 to determine whether the person is a valid user registered in the security system (decision point 406). If the person does not appear in the security data store, access is denied to the device (stage 408). If the person is listed in the security data store, then the system issues a security token or some other type of token to grant the user access to the device (stage 410).

However, the user still cannot actually use the device for the intended activity until the system does further checking. In one implementation, the system must determine whether the user is allowed to perform that activity on the device (decision point 412) and whether performing that activity would cause any potential danger to system security (decision point 414). To do this, the system executes program logic 212 to access the three-dimensional security matrix and determine whether the user is a recognized user who is allowed to use that device for that activity and that device is secure enough to perform that activity safely. If these criteria are met, then program logic 214 executes and grants the user permission to start the activity (stage 416). If at any point in the process, any one of these stages fails, the user is denied access to that device (stage 408). The process ends at end point 418.

Figure 8:
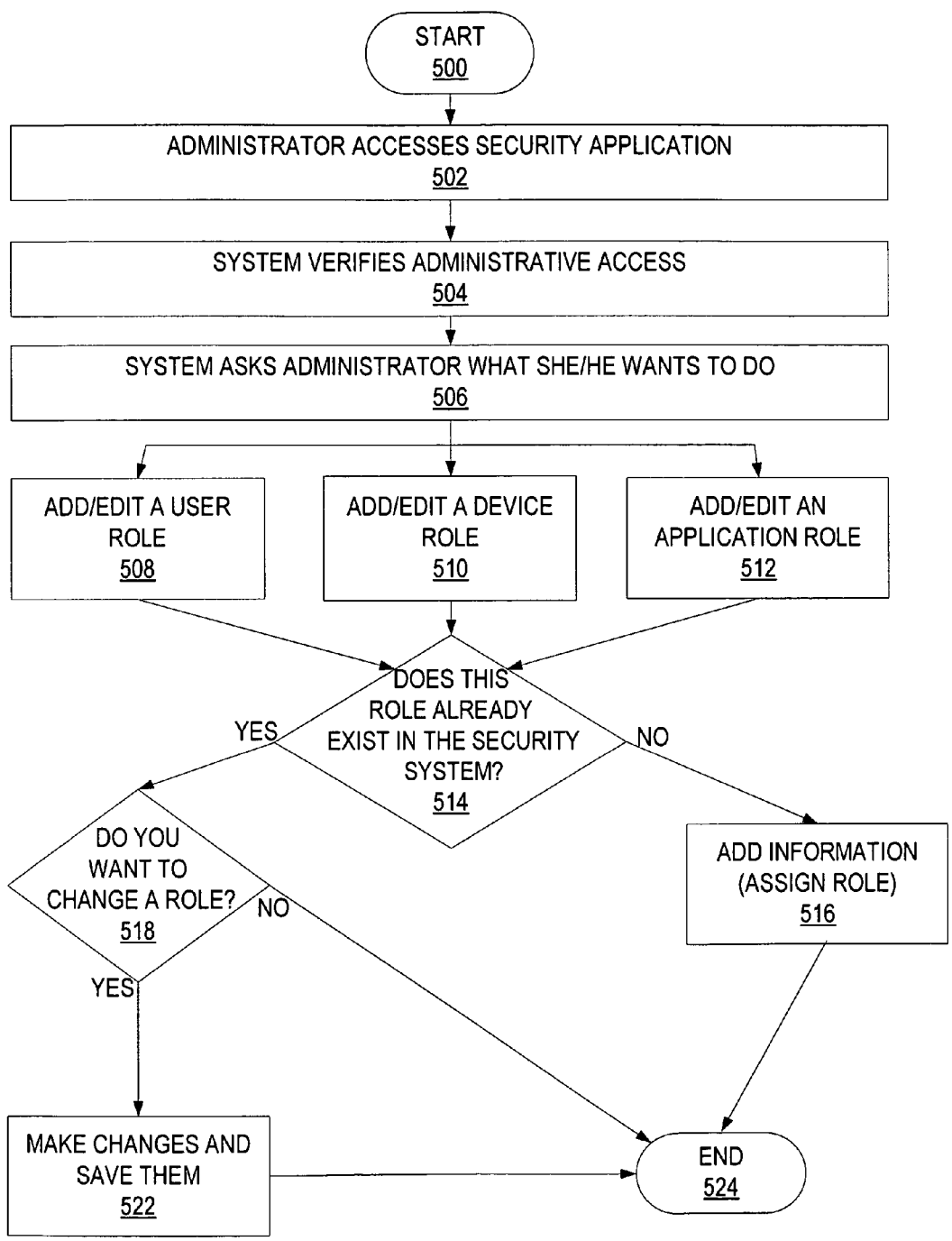
FIG. 8 is a process flow diagram for one implementation of the system of FIG. 1 illustrating the stages involved in adding a role and/or security level to the system of FIG. 1.

FIG. 8 is a flow diagram for one implementation that illustrates the stages involved in having a user with administrative rights add or edit roles in the security application 200. In one form, the process of FIG. 8 is at least partially implemented in the operating logic of computing device 100. FIG. 8 begins at start point 500 with the administrator accessing the security application 200 (stage 502). The system verifies the administrator's identity and the ability to do administrative tasks with security roles (stage 504). The system executes program logic 206 to ask the administrator what task needs to be done (stage 506). Tasks may include, but not be limited to, adding or changing a user role (stage 508), adding or changing a device role (stage 510), and/or adding or changing an application role (stage 512).

By way of example and not limitation, the administrator may add a user (stage 508) such as a guest. A non-limiting example of changing a device (stage 510) may be when a TV is replaced with a high-definition equivalent that has enhanced programming capabilities. This may also require changing an application (stage 512)—for example, what activities various people can do on the device, such as record movies versus purchase movies. Another non-limiting example of changing a device (stage 510) may be when a teenage child purchases a new computer (add a new device to the system and define user roles) and his older personal computer is handed down to a younger child (change the device role and the user role).

The system checks to see if the user, application, and/or device already exists in the system (decision point 514). If it does not, the administrator may add the information and assign one or more roles (stage 516) as is appropriate. If the information already exists in the security system, the system asks the administrator if he or she wants to change any information (decision point 518). If the answer is "no," the process ends at end point 520. If the answer is "yes," the administrator may edit, delete, or otherwise change information as is appropriate and save the changes (stage 522). The process ends at end point 524.

It will be appreciated that some, all, or additional stages than as described in FIGS. 4-8 herein could be used in alternate embodiments, and/or in a different order than as described.

Figure 9:
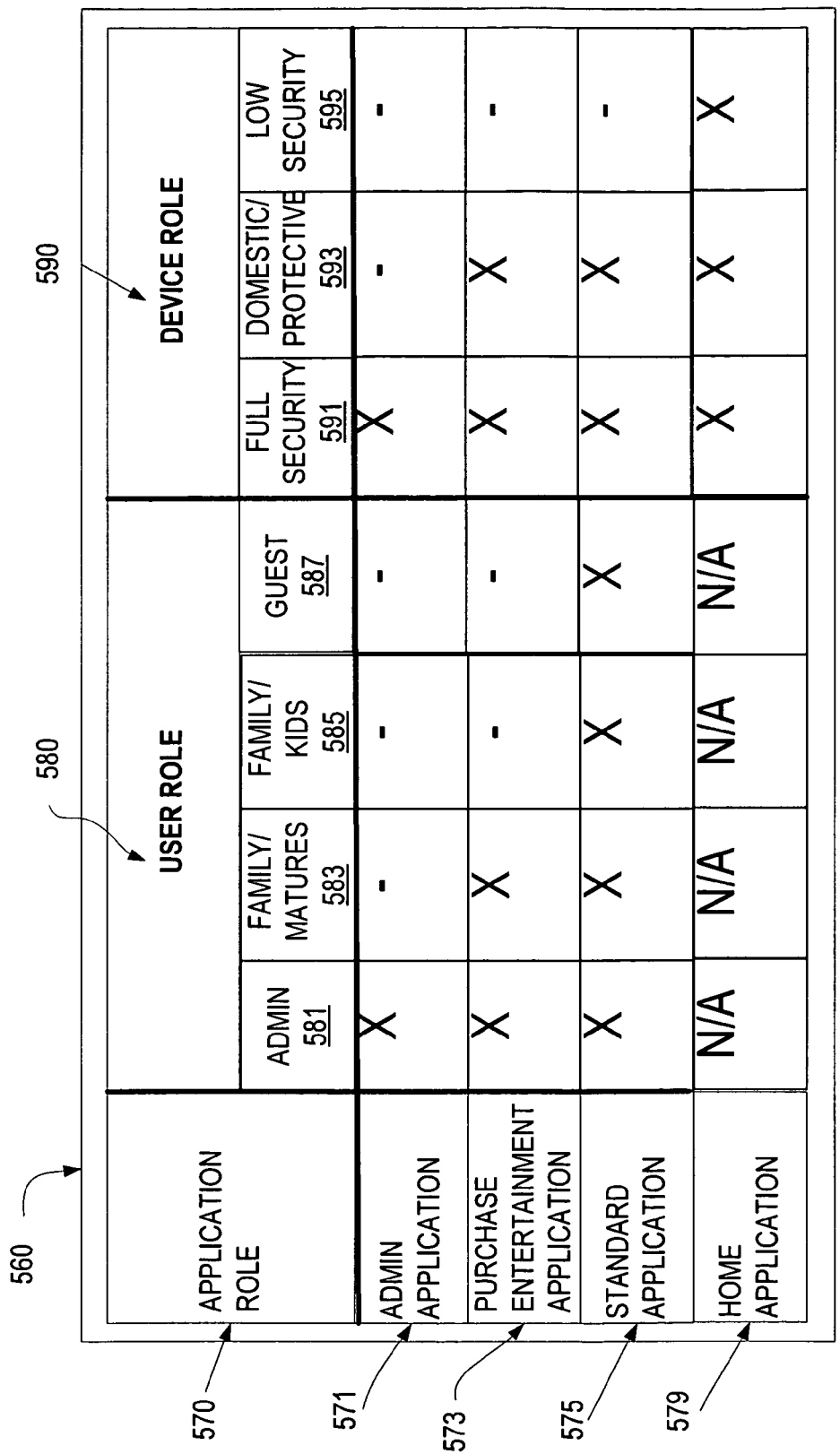
FIG. 9 is a logical diagram for one implementation of the system of FIG. 1 that illustrates one possible security matrix as defined in the system of FIG. 1.

Turning now to FIG. 9, a logical diagram 560 is shown to illustrate a three-dimensional security matrix that is used by security application 200 to determine what users have access to what activities and devices, what devices support what activities, etc. In one implementation, this three-dimensional matrix is just a logical representation of the data stored in data store 126 in a summary manner for the sake of illustration.

An administrator can add, change, or delete roles for the values contained in this security matrix using a user interface provided by security application 200. Various types of user interface screens could be used to allow an administrator to edit the underlying information represented in matrix 560. In addition to defining categories of users (e.g. user roles) 580 and what applications each user is allowed to access (e.g. application roles) 570, the administrator can use security application 200 to also identify and set parameters for each device (e.g. device roles) 590. In one implementation, the sophistication of the device helps determine adequate security. As one non-limiting example, it may not be desirable or safe for a device of low sophistication to handle activities or services that require a high level of security; hence, low-security devices might not be assigned activities such as purchasing movies or activating an outdoor perimeter security system. However, that same device may be allowed to perform "low risk" activities that would not compromise the security of the network. In such an implementation, devices can still participate in the network even if they do not have the same level of sophistication as other devices, but their activities are restricted accordingly.

In one implementation, a single and simple configuration scheme such as the one shown in FIG. 9 can be used to configure an entire home network. In one implementation, assigning roles to users and devices allows for natural groupings of security levels. In another implementation, assigning roles to applications, users, and/or devices allows a simple deployment of new services. As one non-limiting example, if a new device and/or application are added to the network, the administrator just specifies the activities that device supports and the user roles that are already mapped to those activities follow.

Let's look at some specific non-limiting examples of the types of devices and activities that are represented in the example matrix on FIG. 9. Home Application 579 may be used to change room temperature or adjust lighting. This can be operated from any device (591, 593, 595) allowed across the network without any user identification being required.

A Standard Application 575 may include activities such as watching TV or playing music. By way of example and not limitation, matrix 560 shows that all users (581, 583, 585, 587) are allowed to do this on all devices (591, 593) other than those with the lowest level of security 595. The Purchase Entertainment Application 573 may include activities such as purchasing movies. Only user(s) designated as administrator 581 or mature family member(s) 583 are allowed to perform these activities on devices that are capable of handling the task(s) without compromising home security. Therefore, a teenage son 583 may be allowed to purchase movies 573 only on a device with full security 591. A non-limiting example of a device that could provide movie purchasing services with appropriate security is a TV that has the capability to block undesirable movie channels. A non-limiting example of a low-security device 595 that could not provide movie purchasing services without compromising home security is a computer monitor.

Another non-limiting example of this three-dimensional security matrix is use of kitchen electronics, such as a toaster or coffeemaker. A small child 585 would not be granted permission to access either appliance—from the appliance itself or from some remote access—for safety reasons.

An Administrative Application 571 such as defining application/user/device roles may only be performed by a person assigned the Administrator role 581 while using a fully secure device 591, such as a computer in a locked study room. It will be appreciated that these examples discussed and shown on FIG. 9 are examples only, and are non-limiting in nature. Numerous other types of application roles, user roles, and/or device roles could be used instead of or in addition to these.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for authorizing performance of a device dependent home network activity on a home network executed via a processor on a computer comprising a memory whereon computer-executable instructions comprising the method are stored, the method comprising:

providing a security matrix for a plurality of applications, users and devices on a network, the matrix comprising an application role dimension identifying one or more applications that can be accessed to perform one or more device dependent home network activities, where respective applications enable one or more device dependent home network activities to be performed, a user role dimension identifying which of one or more users are authorized to interact with respective applications to perform one or more device dependent home network activities such that security of the home network is not compromised, and a device role dimension identifying one or more levels of security sufficient for a device to possess for the device to engage with respective applications to perform one or more device dependent home network activities such that security of the home network is not compromised;

receiving a request from a particular user to perform a particular device dependent home network activity with a particular device;

accessing the security matrix to determine an application associated with the particular requested activity, whether the particular user is authorized to interact with the application associated with the particular requested activity such that security of the home network is not compromised, and whether the particular device possesses a security level sufficient for the particular device to engage with the application associated with the particular requested activity such that security of the home network is not compromised, and at least one of altering the security matrix for at least one of the plurality of applications, users and devices on the network, where altering the security matrix comprises:

identifying at least one of an application, a user, and a device on the network;

determining whether information corresponding to the identified at least one of application, user, and device exists in the security matrix;

if information corresponding to the identified at least one of application, user, and device does not exists in the security matrix, issuing a notification to an administrator requesting information on the identified at least one of application, user, and device; and altering the security matrix based upon information received in response to the notification, the altered security matrix comprising information corresponding to the identified at least one of application, user, and device, and detecting at least one of a previously unidentified application and a previously unidentified device on the network;

receiving information specifying an activity associated with the detected at least one of a previously unidentified application and a previously unidentified device; and automatically generating one or more user roles for the detected at least one of a previously unidentified application and a previously unidentified device based upon the received information specifying the activity.

2. The method of claim 1, comprising allowing the particular user to perform the particular requested activity with the particular device if:

it is determined that the particular user is authorized to interact with the application associated with the particular requested activity such that security of the home network is not compromised; and it is determined that the particular device possesses a security level sufficient for the particular device to engage with the application associated with the particular requested activity such that security of the home network is not compromised.

3. The method of claim 1, comprising denying the request if at least one of:

it is determined that the particular user is not authorized to interact with the application associated with the particular requested activity such that security of the home network is not compromised;

it is determined that the particular device does not possess a security level sufficient for the particular device to engage with the application associated with the particular requested activity such that security of the home network is not compromised; and it is determined that no application is associated with the particular requested activity.

4. The method of claim 1, comprising authenticating the particular user before accessing the security matrix.

5. The method of claim 1, comprising authenticating the particular device before accessing the security matrix.

6. The method of claim 1, comprising adding an application to the application role dimension if no application is associated with the particular requested activity in the security matrix.

7. The method of claim 6, comprising adding one or more corresponding entries in the user role and device role dimensions when an application is added to the application role dimension.

8. A computer-readable storage device configured to store computer-executable instructions for causing a computer to perform a method comprising:

providing a security matrix for a plurality of applications, users and devices on a network, the matrix comprising an application role dimension identifying one or more applications that can be accessed to perform one or more device dependent home network activities, where respective applications enable one or more device dependent home network activities to be performed, a user role dimension identifying which of one or more users are authorized to interact with respective applications to perform one or more device dependent home network activities such that security of the home network is not compromised, and a device role dimension identifying one or more levels of security sufficient for a device to possess for the device to engage with respective applications to perform one or more device dependent home network activities such that security of the home network is not compromised;

receiving a request from a particular user to perform a particular device dependent home network activity with a particular device;

accessing the security matrix to determine an application associated with the particular requested activity, whether the particular user is authorized to interact with the application associated with the particular requested activity such that security of the home network is not compromised, and whether the particular device possesses a security level sufficient for the particular device to engage with the application associated with the particular requested activity such that security of the home network is not compromised, and at least one of altering the security matrix for at least one of the plurality of applications, users and devices on the network, where altering the security matrix comprises:

identifying at least one of an application, a user, and a device on the network;

determining whether information corresponding to the identified at least one of application, user, and device exists in the security matrix;

if information corresponding to the identified at least one of application, user, and device does not exists in the security matrix, issuing a notification to an administrator requesting information on the identified at least one of application, user, and device; and altering the security matrix based upon information received in response to the notification, the altered security matrix comprising information corresponding to the identified at least one of application, user, and device, and detecting at least one of a previously unidentified application and a previously unidentified device on the network;

receiving information specifying an activity associated with the detected at least one of a previously unidentified application and a previously unidentified device; and automatically generating one or more user roles for the detected at least one of a previously unidentified application and a previously unidentified device based upon the received information specifying the activity.

9. The computer-readable storage device of claim 8, the method comprising allowing the particular user to perform the particular requested activity with the particular device if:

it is determined that the particular user is authorized to interact with the application associated with the particular requested activity such that security of the home network is not compromised; and it is determined that the particular device possesses a security level sufficient for the particular device to engage with the application associated with the particular requested activity such that security of the home network is not compromised.

10. The computer-readable storage device of claim 8, the method comprising denying the request if at least one of:

it is determined that the particular user is not authorized to interact with the application associated with the particular requested activity such that security of the home network is not compromised;

it is determined that the particular device does not possess a security level sufficient for the particular device to engage with the application associated with the particular requested activity such that security of the home network is not compromised; and it is determined that no application is associated with the particular requested activity.

11. The computer-readable storage device of claim 8, the method comprising authenticating the particular user before accessing the security matrix.

12. The computer-readable storage device of claim 8, the method comprising adding an application to the application role dimension and adding one or more corresponding entries in the user role and device role dimensions if no application is associated with the particular requested activity in the security matrix.

13. A system configured to authorize performance of a device dependent home network activity on a home network, comprising:

a server configured to communicate with a plurality of devices on a home network, comprising an authorization service component configured to communicate with a security matrix in a data store to determine whether a particular user is authorized to perform a particular requested device dependent home network activity with a particular device; and the data store configured to store the security matrix for a plurality of applications, users and devices on the network, the matrix comprising an application role dimension identifying one or more applications that can be accessed to perform one or more device dependent home network activities, where respective applications enable one or more device dependent home network activities to be performed, a user role dimension identifying which of one or more users are authorized to interact with respective applications to perform one or more device dependent home network activities such that security of the home network is not compromised, and a device role dimension identifying one or more levels of security sufficient for a device to possess for the device to engage with respective applications to perform one or more device dependent home network activities such that security of the home network is not compromised, the authorization service component configured to at least one of alter the security matrix for at least one of the plurality of applications, users and devices on the network, where altering the security matrix comprises:

identifying at least one of an application, a user, and a device on the network;

determining whether information corresponding to the identified at least one of application, user, and device exists in the security matrix;

if information corresponding to the identified at least one of application, user, and device does not exists in the security matrix, issuing a notification to an administrator requesting information on the identified at least one of application, user, and device; and altering the security matrix based upon information received in response to the notification, the altered security matrix comprising information corresponding to the identified at least one of application, user, and device, and detect at least one of a previously unidentified application and a previously unidentified device on the network;

receive information specifying an activity associated with the detected at least one of a previously unidentified application and a previously unidentified device; and automatically generate one or more user roles for the detected at least one of a previously unidentified application and a previously unidentified device based upon the received information specifying the activity.

14. The system of claim 13, the authorization service component configured to authorize a particular user to perform a particular requested device dependent home network activity with a particular device if:

it is determined that the particular user is authorized to interact with the application associated with the particular requested activity such that security of the home network is not compromised; and it is determined that the particular device possesses a security level sufficient for the particular device to engage with the application associated with the particular requested activity such that security of the home network is not compromised.

15. The system of claim 13, the authorization service component configured to not authorize a particular user to perform a particular requested device dependent home network activity with a particular device if at least one of:

it is determined that the particular user is not authorized to interact with the application associated with the particular requested activity such that security of the home network is not compromised;

it is determined that the particular device does not possess a security level sufficient for the particular device to engage with the application associated with the particular requested activity such that security of the home network is not compromised; and it is determined that no application is associated with the particular requested activity.

16. The system of claim 13, where the device dependent home network activity comprises an activity that is limited to a particular device.

17. The system of claim 13, the authorization service component configured to add an application to the application role dimension and add one or more corresponding entries in the user role and device role dimensions if no application is associated with a particular requested activity in the security matrix.

18. The method of claim 4, where authenticating the particular user comprises:

receiving a unique login credential from the particular user;

determining whether the particular user is registered in a security data store based upon the unique login credential; and issuing a user token to the particular user in response to a determination that the particular user is registered in the security data store.

* * * * *